US010542137B1

United States Patent
Sial et al.

(10) Patent No.: US 10,542,137 B1
(45) Date of Patent: Jan. 21, 2020

(54) SCAM CALL BACK PROTECTION

(71) Applicant: T-Mobile USA, Inc., Bellevue, WA (US)

(72) Inventors: Muhammad Ejaz Sial, Snoqualmie, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/246,339

(22) Filed: Jan. 11, 2019

Related U.S. Application Data (60) Provisional application No. 62/717,600, filed on Aug. 10, 2018.

(51) Int. Cl.
| | |
|---|---|
| *H04M 3/42* | (2006.01) |
| *H04M 1/57* | (2006.01) |
| *H04L 29/06* | (2006.01) |
| *H04M 3/436* | (2006.01) |

(52) U.S. Cl.
CPC .... *H04M 3/42042* (2013.01); *H04L 65/1006* (2013.01); *H04L 65/1016* (2013.01); *H04M 1/571* (2013.01); *H04M 1/578* (2013.01); *H04M 3/4365* (2013.01)

(58) Field of Classification Search
CPC ........... H04M 3/42042; H04M 3/4365; H04M 1/571; H04M 1/578; H04L 65/1006; H04L 65/1016
USPC ....................................................... 455/415
See application file for complete search history.

(56) References Cited

U.S. PATENT DOCUMENTS

| | | | | |
|---|---|---|---|---|
| 9,294,923 | B2* | 3/2016 | Meacham | ........... H04L 63/1416 |
| 9,332,119 | B1 | 5/2016 | Danis | |
| 9,614,974 | B1* | 4/2017 | Hodge | ................ H04M 7/0078 |
| 9,912,688 | B1* | 3/2018 | Shaw | .................... H04W 28/02 |
| 10,182,034 | B1* | 1/2019 | Koster | .................. H04M 15/06 |
| 10,397,402 | B1* | 8/2019 | Wold | ..................... G06Q 30/01 |

(Continued)

FOREIGN PATENT DOCUMENTS

| | | |
|---|---|---|
| CN | 101998318 A | 3/2011 |
| KR | 20150031898 A | 3/2015 |

OTHER PUBLICATIONS

PCT Search Report and Written Opinion dated Oct. 15, 2019 for PCT Application No. PCT/US2019/042979, 12 pages.

*Primary Examiner* — Mong-Thuy T Tran
(74) *Attorney, Agent, or Firm* — Lee & Hayes, P.C.

(57) ABSTRACT

When an application server receives an invite message associated with a call from an originating user equipment (UE) to a terminating UE, the application server can determine if one of the originating UE or the terminating UE is associated with a scammer. If the originating UE is associated with a scammer, the application server can remove the scammer's caller identification (ID) information from the invite message, such that a user of the terminating UE cannot use that caller ID information to make a return call to the scammer. If the terminating UE is associated with a scammer, the application server can remove caller ID information associated with the originating UE from the invite message to hide the calling party's information from the scammer, and/or invoke playback of a scam announcement to the originating UE to warn the calling party that they are calling a scammer.

20 Claims, 7 Drawing Sheets

(56) References Cited

U.S. PATENT DOCUMENTS

| | | | | |
|---|---|---|---|---|
| 2006/0281447 A1* | 12/2006 | Lewis | ............... | H04M 3/42042 |
| | | | | 455/418 |
| 2007/0025530 A1 | 2/2007 | Tidwell et al. | | |
| 2010/0049697 A1* | 2/2010 | Hsiao | ..................... | G06Q 10/10 |
| | | | | 715/751 |
| 2010/0115034 A1* | 5/2010 | Sheth | ............... | H04M 3/42042 |
| | | | | 709/206 |
| 2010/0226261 A1* | 9/2010 | Piche | ............... | H04L 29/06027 |
| | | | | 370/252 |
| 2012/0210007 A1* | 8/2012 | Ormazabal | ......... | H04L 63/0227 |
| | | | | 709/227 |
| 2012/0219127 A1 | 8/2012 | Lu et al. | | |
| 2014/0192965 A1* | 7/2014 | Almeida | ............... | H04M 3/436 |
| | | | | 379/70 |
| 2018/0324297 A1* | 11/2018 | Kent | .................... | H04Q 3/0083 |
| 2019/0174000 A1* | 6/2019 | Bharrat | .................. | H04M 3/4365 |
| 2019/0215346 A1* | 7/2019 | Seyvet | ............... | H04M 1/2535 |

\* cited by examiner

SCAM CALL BACK PROTECTION

RELATED APPLICATIONS

This U.S. Patent Application claims priority to provisional U.S. patent application Ser. No. 62/717,600, entitled "SCAM CALL PROTECTION—CALL BACK PREVENTION," filed on Aug. 10, 2018, the entirety of which is incorporated herein by reference.

BACKGROUND

The number of scam calls placed over telecommunication networks has unfortunately been growing. Scammers use manual dialing or robocall techniques to place scam calls in the hopes that recipients will answer the scam calls. If a recipient answers a scam call, the scammer may be able to convince the recipient to disclose personal information, to transfer money to the scammer, or to ensnare the recipient in any other type of scam.

Some scam calls come from phone numbers that recipients do not recognize, although the recipients may choose to answer the calls anyway. In some cases, a scammer can spoof their phone number so that their call appears to a recipient to be coming from a similar phone number as the recipient's phone number. In many cases, a recipient may think that a scam call from a spoofed number is coming from a party in the same neighborhood as the recipient, possibly making it more likely that the recipient will answer the scam call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Unfortunately, scammers make scam calls to target users to attempt to ensnare the target users into scams. For example, a scammer may make a scam call to try to mislead or coerce a target user into providing personal information and/or transferring money to the scammer, or for other nefarious purposes. In some examples, scam calls can be voice calls, video calls, conference calls, or other types of real-time communications that may ring at a target user's UE, and appear in missed call information if they are not answered. In other examples, scam calls can be non-real-time communications such as short message service (SMS) text messages or multimedia messaging service (MMS) messages, which may be delivered to and/or presented by a target user's UE without input from the target user.

Telecommunication networks and/or user equipment (UE) can provide users with information about incoming calls that can help users identify and/or avoid scam calls. For example, a telecommunication network can provide caller identification (ID) information to a recipient UE, such that the recipient UE can display a caller's phone number, name, and/or other identifying information when the call is ringing and/or in a call history log. Such caller ID information can allow a user to determine if they recognize the caller, possibly helping them to determine whether to answer the call. If the scam call is a text or multimedia message, the message can be displayed by the UE along with the caller ID information to help a user understand who sent the message.

Nevertheless, many users may still decide to answer or reply to calls even if they do not recognize the caller ID information. In some cases, scammers can spoof the calling number in the caller ID information to make it more likely that a recipient will answer or reply to the call. For instance, in a "neighborhood spoofing" scheme a scammer can use a spoofed calling number that is similar to a target user's own phone number, such as a spoofed calling number that shares the same first few digits as the target user's own phone number. This may cause the target user to think that a call is from entity in the target user's neighborhood, possibly increasing the chances that the target user will answer or reply to the call.

Accordingly, a telecommunication network can take further steps to warn its subscribers about potential scam calls. For example, when an incoming call is being routed to a UE, the telecommunication network can look up the caller ID information in a scam database. If the scam database indicates that the caller ID information is associated with a likely scammer, the telecommunication network can also provide a scam indicator to the UE. Although not all UEs are configured to interpret or use such scam indicators, some UEs can be configured to display a scam warning based on a received scam indicator while a call is ringing. This scam warning can inform a user that the ringing call is likely a scam call. However, many UEs do not present similar scam warnings in association with missed calls, regardless of whether or not those UEs are configured to present scam warnings when a call is ringing. For example, many UEs do not display scam warnings in missed call information or in call history logs. Similarly, when a scam call is a text or multimedia message, many UEs are not configured to display scam warnings when displaying the message to a user.

Scammers have developed strategies to take advantage of the chance that a target UE is not configured to present a scam warning in association with a missed call or with a scam message. For example, a scammer may place a voice or video call but intentionally hang up quickly so that the call rings at a target UE only briefly or does not ring at all, but is logged as a missed call. Accordingly, a target user may not see a scam warning in association with the missed call even if the target UE would have displayed one while the call was ringing. The target user may instead see a missed call notification or see the missed call in a call history log, and become curious about the missed call. Without having seen a scam warning, the target user may try to place a call back to the phone number listed with the missed call information, possibly reaching the scammer and becoming ensnared in a scam. If the call is a scam message, a target user may similarly see the scam message without a scam warning, and either reply to the scam message or place a voice or video call back to the scammer based on caller ID information displayed with the scam message.

Described herein are systems and methods by which a telecommunication network can shield a scammer's caller ID information from a target UE, such that the scammer's caller ID information is not displayed by the target UE. Accordingly, a user of the target UE would not be able to use the scammer's caller ID information to place a return call back to the scammer. Also described herein are systems and methods by which a target user's caller ID information can be shielded from a scammer's UE if the target user does try to place a call to a likely scammer, and systems and methods by which the telecommunication network can warn a user that he or she is attempting to call a likely scammer.

Example Environments

Figure 1:
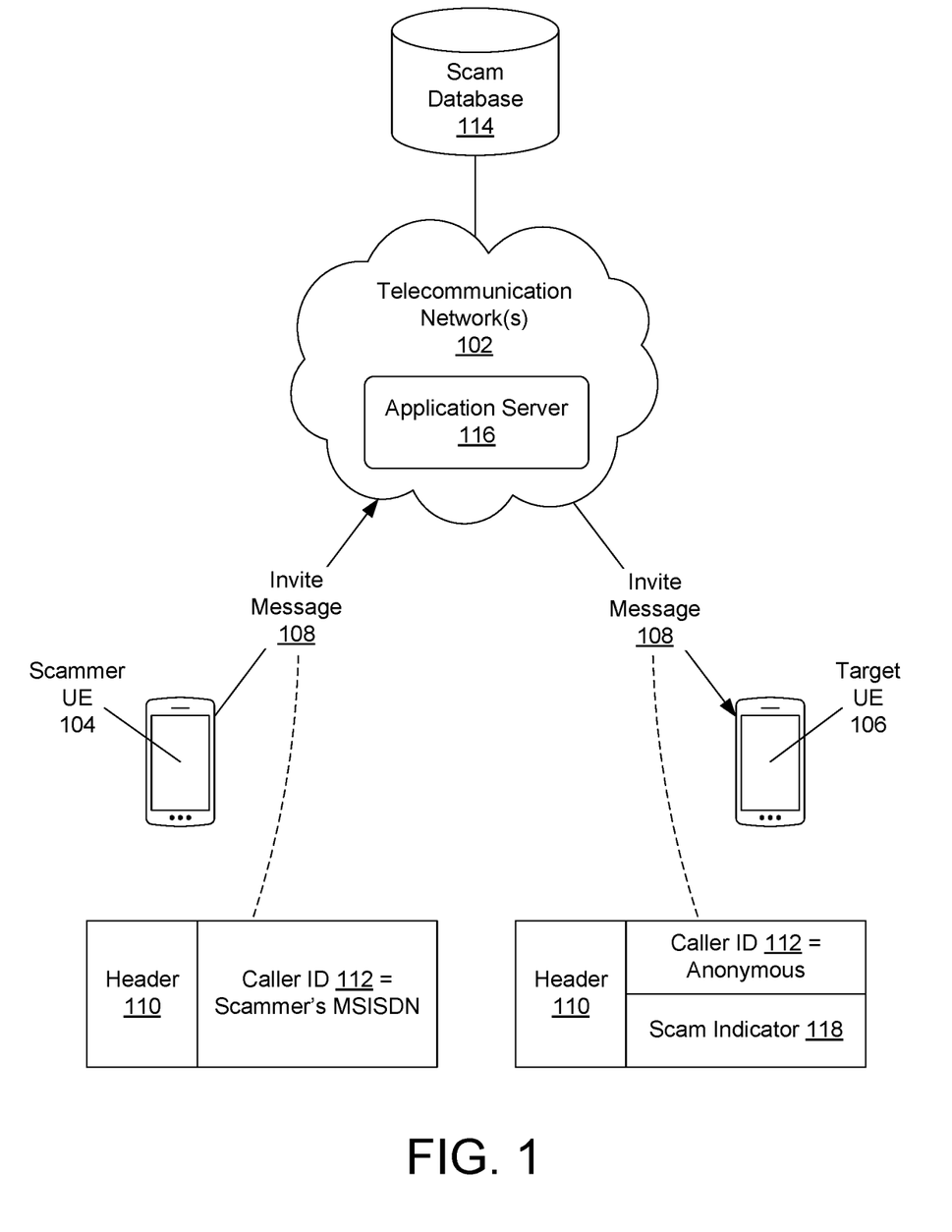
FIG. 1 depicts an example environment in which user equipment (UE) can connect to telecommunication networks, and a scammer UE sends an invite message to a telecommunication network to attempt to place a call to a target UE.

FIG. 1 depicts an example environment in which user equipment (UE) can connect to a telecommunication network 102 to make or receive calls, transmit or receive messages and/or other data, and/or perform any other network operation.

A UE, including the scammer UE 104 and the target UE 106 described below, can be implemented as any of a variety of types of user devices. As one example, a UE can be implemented as a mobile telephone. As another example, a UE can be implemented as an Internet of Things (IoT) device. In some examples, a UE can be implemented as any suitable mobile computing device configured to communicate over wired and/or wireline networks, including the telecommunication network 102 described herein. As additional examples, a UE can be implemented as a mobile phone (e.g., a smart phone), a tablet computer, a laptop computer, a personal digital assistant (PDA), a wearable computer (e.g., electronic/smart glasses, a smart watch, fitness trackers, etc.), a networked digital camera, a media player, a portable gaming device, and/or similar mobile devices. Although the examples above are predominantly related to "mobile" (i.e., configured to be carried and moved around), a UE can also be a communication device that is generally stationary, such as a television, a desktop personal computer (PC), a workstation, a gaming console, a set top box, an IoT device, and/or any other type of computing or communication device. The terms "communication device," "wireless device," "wireline device," "mobile device," "computing device," and "user equipment (UE)" may be used interchangeably herein to describe any communication device capable of performing the techniques described herein.

The telecommunication network 102 and/or other networks to which a UE can connect can be wired networks and/or wireless networks that use any suitable wireless communications/data technology, protocol, or standard. For example, the telecommunication network 102 can be a wireless telecommunication network that is compatible with one or more wireless access technologies, including fifth generation (5G) technology, Long Term Evolution (LTE)/ LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Time Division Multiple Access (TDMA) technology, Orthogonal Frequency Division Multiple Access (OFDM) technology, Evolution-Data Optimized (EVDO) technology, Generic Access Network (GAN) technology, Unlicensed Mobile Access (UMA) technology, General Packet Radio Service (GPRS) technology, Enhanced Data GSM Environment (EDGE) technology, Advanced Mobile Phone System (AMPS) technology, Global System for Mobile Communications (GSM) technology, Voice over IP (VoIP), Voice over LTE (VoLTE), Voice over New Radio (VoNR), IEEE 802.1x protocols, WiMAX, Wi-Fi, or any other previous or future generation of wireless access technology including any future IP-based network technology or evolution of an existing IP-based network technology. In other examples, a telecommunication network 102 can be a wired telecommunication network, such as a public switched telephone network (PSTN).

Different UEs that are engaged in a communication session may be connected to the same telecommunication network, or to different telecommunication networks that are interconnected. For example, a first UE engaged in a voice call can be wirelessly connected to a wireless telecommunication network, while a second UE engaged in the same voice call can be a landline telephone connected to a PSTN that interconnects with the wireless telecommunication network. As another example, a first UE engaged in a voice call can be wirelessly connected to a first wireless telecommunication network, while a second UE engaged in the same voice call can be wirelessly connected to a second wireless telecommunication network that is peered with the first wireless telecommunication network.

Unfortunately, some UEs can be associated with malicious users known as scammers who attempt to contact UEs of other users under false pretenses to steal their money, obtain their personal information, and/or perform other nefarious acts. Accordingly, UEs can be scammer UEs 104 used by scammers, or target UEs 106 used by target users that scammers may try to ensnare into their scams.

In some situations, a target UE 106 can be connected to a telecommunication network 102 via a wireless connection to a base station, while a scammer UE 104 can connect to the same or a different telecommunication network 102 through a wired connection or a wireless connection. For example, a target UE 106 can be a mobile phone wirelessly connected to a first telecommunication network 102, while a scammer UE 104 can be another mobile phone wirelessly connected to the first telecommunication network 102 or to a second telecommunication network 102 that is peered with the first telecommunication network 102. As another example, a target UE 106 can be a mobile phone wirelessly connected to a telecommunication network 102, while a scammer UE 104 can be a landline phone connected to a PSTN.

A scammer UE 104 can attempt to initiate a call to a target UE 106 by sending an invite message 108 to a telecommunication network 102. In some examples, the invite message 108 can be a Session Initiation Protocol (SIP) message, such as a SIP INVITE message. The invite message 108 can be a request to set up a communication session for the call, such as a communication session for a video call, voice call, conference call, text or multimedia messages, and/or any other type of call or communication.

The invite message 108 can be routed through the telecommunication network 102 and/or other telecommunication networks 102 and be delivered to the target UE 106. If the target UE 106 accepts the invite message 108, additional messages can be exchanged through the telecommunication network(s) 102 to establish an active call between the scammer UE 104 and the target UE 106. Otherwise, if the target UE 106 does not accept the invite message 108, the target UE 106 can log information in the invite message 108 as missed call information that can be presented to a target user in a missed call notification and/or in a call history log. In some examples in which the call is a text or multimedia message, the text or multimedia message can be automatically accepted by the target UE 106 and stored for display to a user.

An invite message 108 can have a header 110 that can indicate caller identification (ID) 112 information. In some examples, caller ID 112 information can be stored in a "P-Asserted-Identity" (PAI) field of an invite message's header 110. Caller ID 112 information can identify a phone number associated with the calling UE, such as the calling party's Mobile Station International Subscriber Directory Number (MSISDN). Caller ID 112 can also be referred to as Calling Line Identification (CLI), Originating Identification (OI), a caller number, a calling number, an origination number, and other similar terms.

Figure 4:
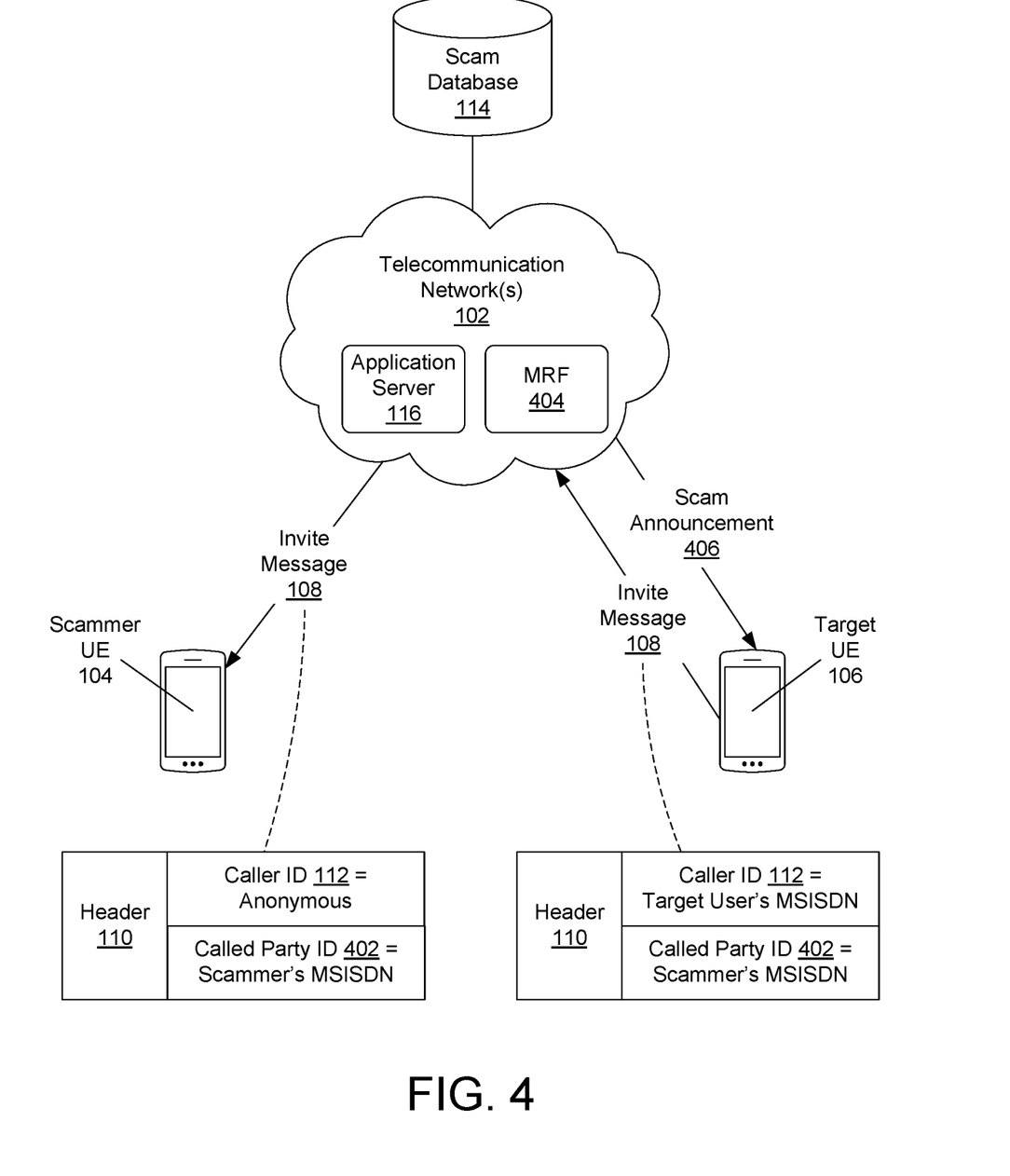
FIG. 4 depicts an example in which a target UE sends an invite message to a telecommunication network to attempt to place a call to a scammer UE.

The invite message's header 110 can also indicate other types of information, including a called party ID. A called party ID can identify a phone number associated with a terminating UE that the calling UE is attempting to call, such as the called party's MSISDN. A called party ID can also be referred to as a called number, a terminating number, and other similar terms. A called party ID in an invite message's header 110 is shown in FIG. 4, and is discussed further below with respect to that figure.

As shown in FIG. 1, when a scammer UE 104 initiates a call to a target UE 106 by sending an invite message 108, the caller ID 112 in the invite message's header 110 can be the scammer's MSISDN. In some cases, the scammer's MSISDN may be a real MSISDN associated with the scammer UE 104. In other cases, the scammer's MSISDN may be a spoofed number intended to mislead a target user about the origin of the call.

A telecommunication network 102 can have, or have access to, a scam database 114. The scam database 114 can include information about MSISDNs associated with likely scammers. For example, the scam database 114 can include MSISDNs reported by users to be associated with scams, MSISDNs that pattern recognition algorithms indicate are likely to be scam numbers and/or spoofed numbers, and/or MSISDNs that have otherwise been identified as likely being scam numbers. In some examples, an operator of the scam database 114 can perform investigations about reported MSIDSNs or suspected scam MSISDNs to verify that they are likely to be associated with scams and should be included in the scam database 114, such as placing calls to such MSIDSNs to determine if they are associated with suspicious behavior. In some examples, the scam database 114 can be a third-party database accessible by one or more telecommunication networks 102. In other examples, the scam database 114 can be a database maintained by the operator of the telecommunication network 102 to which the target UE 106 is connected.

The scam database 114 can be used by a telecommunication network 102 handling a terminating leg of an attempted call to a target UE 106 to determine if the scam database 114 indicates that a caller ID 112 in an invite message's header 110 is likely associated with a scammer. This information can be used as described herein to help protect users of target UEs 106 from scam calls from scammer UEs 104. In some examples, an application server 116 of the telecommunication network 102 can look up caller ID 112 information with the scam database 114, as described further below with respect to FIG. 2. In other examples, an Interconnect Session Border Controller (I-SBC) 302 of the telecommunication network 102 can look up caller ID 112 information with the scam database 114, as described further below with respect to FIG. 3.

In some examples, an application server 116, an I-SBC 302, or another element of the telecommunication network 102 can use a Representational State Transfer (REST) Application Programming Interface (API) to look up caller ID 112 information from an invite message 108 in the scam database 114. In these examples, a REST API call to the scam database 114 can return a message or other value indicating that the caller ID 112 information is likely associated with a scammer.

In other examples, an application server 116, an I-SBC 302, or another element of the telecommunication network 102 can use an Electronic Number Mapping System (ENUM) query to look up caller ID 112 information from an invite message 108 in the scam database 114. In these examples, the ENUM query may return a predefined Service Provider ID (SPID) and/or Routing Number (RN) indicating that the caller ID 112 information is likely associated with a scammer.

When the scam database 114 indicates that the caller ID 112 is likely associated with a scammer, an application server 116, an I-SBC 302, or another element of the telecommunication network 102 can modify the invite message's header 110 to include a scam indicator 118. The scam indicator 118 can be a text string such as "Scam Likely," a code or alphanumeric value, a flag, or any other type of information indicating that the invite message 108 is likely associated with a scam call. For example, if an invite message 108 includes an MSISDN as a caller ID 112 that the scam database 114 identifies as being associated with a scammer, a PAI field or other portion of the invite message's header 110 can be added or modified to include a scam indicator 118.

Some target UEs 106 can be configured to present scam warnings if they receive an invite message 108 that includes a scam indicator 118, for instance while the call is ringing at the target UE 106. For example, when a target UE 106 receives an invite message 108, the target UE 106 can begin to ring to give a user a chance to answer the call. However, based on the scam indicator 118 in the invite message 108, the target UE 106 can also display a message, icon, or other type of information informing the user that the call is likely a scam call, use an alternate ringtone to inform the user that the call is likely a scam call, or provide a scam warning to the user in any other manner.

However, if a user does not answer the call when it is ringing and while the scam warning is displayed, some target UEs 106 are not configured to present scam call warnings to users in missed call notifications or in call history logs. Accordingly, even if a scam indicator 118 is included in an invite message 108 and a scam warning would have been presented by a target UE 106 when the call was ringing, users may not see a similar scam warning when reviewing missed call information. Similarly, a target UE 106 that is not configured to present scam warnings when a call is ringing would also not present them in missed call information. Additionally, if the call is a non-real-time communication such as a text message or multimedia message, some target UEs 106 may display the non-real-time communication to users without displaying a corresponding scam warning in a messaging application or notification.

If a target UE's missed call information were to present an MSISDN from an invite message's caller ID 112 but not present a scam warning based on a scam indicator 118, a target user may become curious about who called them and try to call back a scammer using that MSISDN, potentially becoming ensnared in a scam. Some scammers have attempted to increase the frequency of these missed call back scenarios by hanging up calls soon after they are placed such that target UEs 106 either ring briefly or do not ring at all, but the calls still appear in missed call information so that curious users of target UEs 106 may try to call back the scammer. Similarly, if a target UE 106 is not configured to display scam warnings with scam text or multimedia messages, a user of the target UE 106 may try to use the caller ID 112 information to place a call back to the scammer or send a reply message to the scammer.

However, such call backs and reply messages to scammers can be avoided as described herein because the application server 116 can remove and/or replace a caller ID 112 in an invite message's header 110 when a scam database 114 indicates that the original caller ID 112 is likely associated with a scammer. For example, the application server 116 can remove a scammer's MSIDSN from caller ID 112 information in an invite message's header 110, and/or replace the scammer's MSIDSN in the caller ID 112 information with "Anonymous" or another value. The text string "Anonymous" can be defined in standards such that receiving UEs are expected to understand how to process invite messages 108 that include "Anonymous" instead of an MSISDN as caller ID 112 information in their header 108. The removal and/or replacement of an MSISDN in the caller ID 112 of an invite message's header 110 can be referred to as a Calling Line Identification Restriction (CLIR) or Originating Identification Restriction (OIR) process.

Accordingly, because the scammer's MSIDSN would not be included as a caller ID 112 when the invite message 108 reaches the target UE 106, the target UE 106 would not display the scammer's MSISDN when the call is ringing. For example, the target UE 106 may display "Anonymous," "Private Call," "No Number," "Unknown," or otherwise not display the scammer's MSISDN when the call is ringing, potentially decreasing the chances that a target user will choose to answer the call. The target UE 106 may also present "Anonymous," "Private Call," "No Number," "Unknown," or other value instead of the scammer's MSISDN in a missed call notification, a call history list, or in a messaging application or notification. Accordingly, in the event of a missed call from the scammer, the target user of the target UE 106 would not be able to learn the scammer's MSISDN from the missed call information and use the scammer's MSISDN to attempt a call back to the scammer. Similarly, the target user would not learn the scammer's MSISDN from a messaging application or notification when the scam call is a text or multimedia message.

Figure 2:
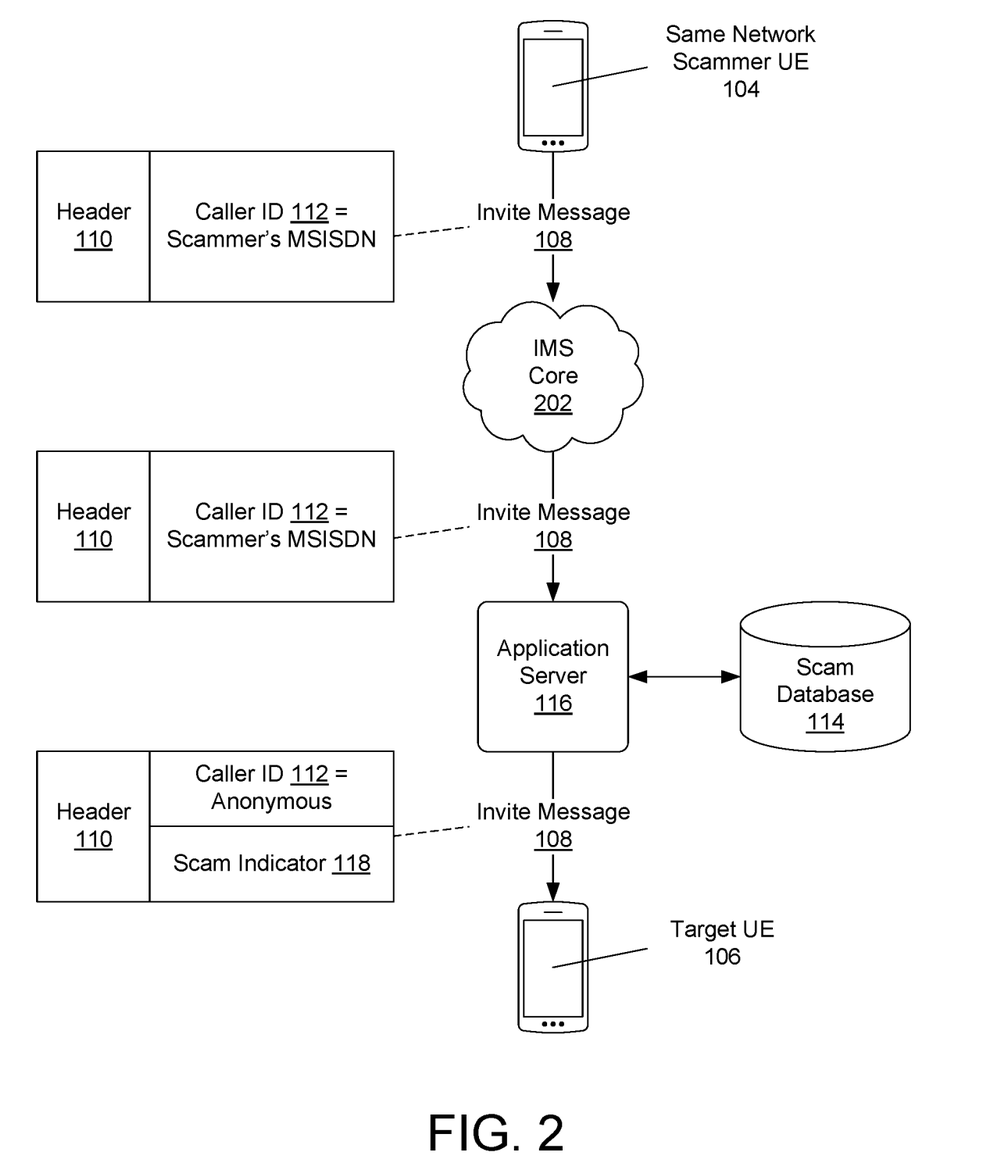
FIG. 2 depicts an example in which a scam call originates from a scammer UE that is connected to the same telecommunication network as a target UE.

FIG. 2 depicts an example in which a scam call originates from a scammer UE 104 that is connected to the same telecommunication network 102 as a target UE 106. The scammer UE 104 can attempt to initiate a call to the target UE 106 by transmitting an invite message 108 to the telecommunication network 102. The invite message 108 can identify the target UE 106, such as by an MSISDN associated with the target UE 106 included as a called party ID in a header 110 of the invite message 108. The invite message 108 can also include an MSISDN associated with the scammer UE 104 as caller ID 112 information in a header 110.

The invite message 108 can be routed through a core network of the telecommunication network 102 to an Internet Protocol (IP) Multimedia Subsystem (IMS). The IMS can have one or more elements that can set up and/or manage communication sessions for UEs, for example by using SIP messages to exchange information with each other and/or UEs. The IMS can include an IMS core 202 with one or more Call Session Control Functions (CSCFs) that process and/or route SIP messages, including Proxy CSCFs (P-CSCFs), Interrogating-CSCFs (I-CSCFs), and/or Serving-CSCFs (S-CSCFs).

The IMS core 202 can be linked to one or more application servers 116 that provide services for communication sessions. For example, an application server 116 can be a telephony application server (TAS) that sets up and manages communication sessions for voice calls. Other types of application servers 116 can manage communication sessions for text messages, multimedia messages, video calls, conferences, and/or any other type of communications. Example architecture for an application server 116 is illustrated in greater detail in FIG. 5, and is described in detail below with reference to that figure.

The IMS core 202 can route the invite message 108 to an application server 116 that can handle the terminating leg of the call. For example, when the attempted call is a voice call, the application server 116 to which the invite message 108 is routed can be a TAS. When the application server 116 receives the invite message 108, the application server 116 can look up, in the scam database 114, the MSISDN included as caller ID 112 information in the header 110 of the received invite message 108. The application server 116 can look up the MSISDN in the caller ID 112 information in the scam database 114 using a REST API query, an ENUM query, or any other type of query as described above. If the scam database 114 indicates that the MSISDN in the caller ID 112 information is associated with a likely scammer, the application server 116 can add a scam indicator 118 to the header 110 of the invite message 108. For example, the application server 116 can add or alter a PAI field of the header 110 to include "Scam Likely" or any other type of scam indicator 118.

Additionally, when the scam database 114 indicates that the MSISDN in the caller ID 112 information is associated with a likely scammer, the application server 116 can remove and/or replace the MSISDN in the caller ID 112 information. For example, the application server 116 can remove a scammer's MSISDN from a PAI field of the header 110 and/or replace it with an "Anonymous" or another alternate value.

The application server 116 can forward the invite message 108, with the modified caller ID 112, on through the telecommunication network 102 to the target UE 106, such that the target UE 106 receives the invite message 108 with a header 110 that includes the scam indicator 118 and does not include the scammer's MSISDN. In some examples, the modified invite message 108 can be routed from the application server 116 to the target UE 106 at least partially through the IMS core 202.

If the target UE 106 is configured to present scam warnings, it can present a scam warning while the call is ringing based on the scam indicator 118. Additionally, due to the removal and/or replacement of the scammer's MSISDN from the caller ID 112 information, the target UE 106 would also not present the scammer's MSISDN while the call is ringing or in a missed call notification or call history list. In examples in which the call is a non-real-time communication, such as a text or multimedia message, the target UE 106 would also not present the scammer's MSISDN when displaying or presenting the non-real-time communication to a user.

Figure 3:
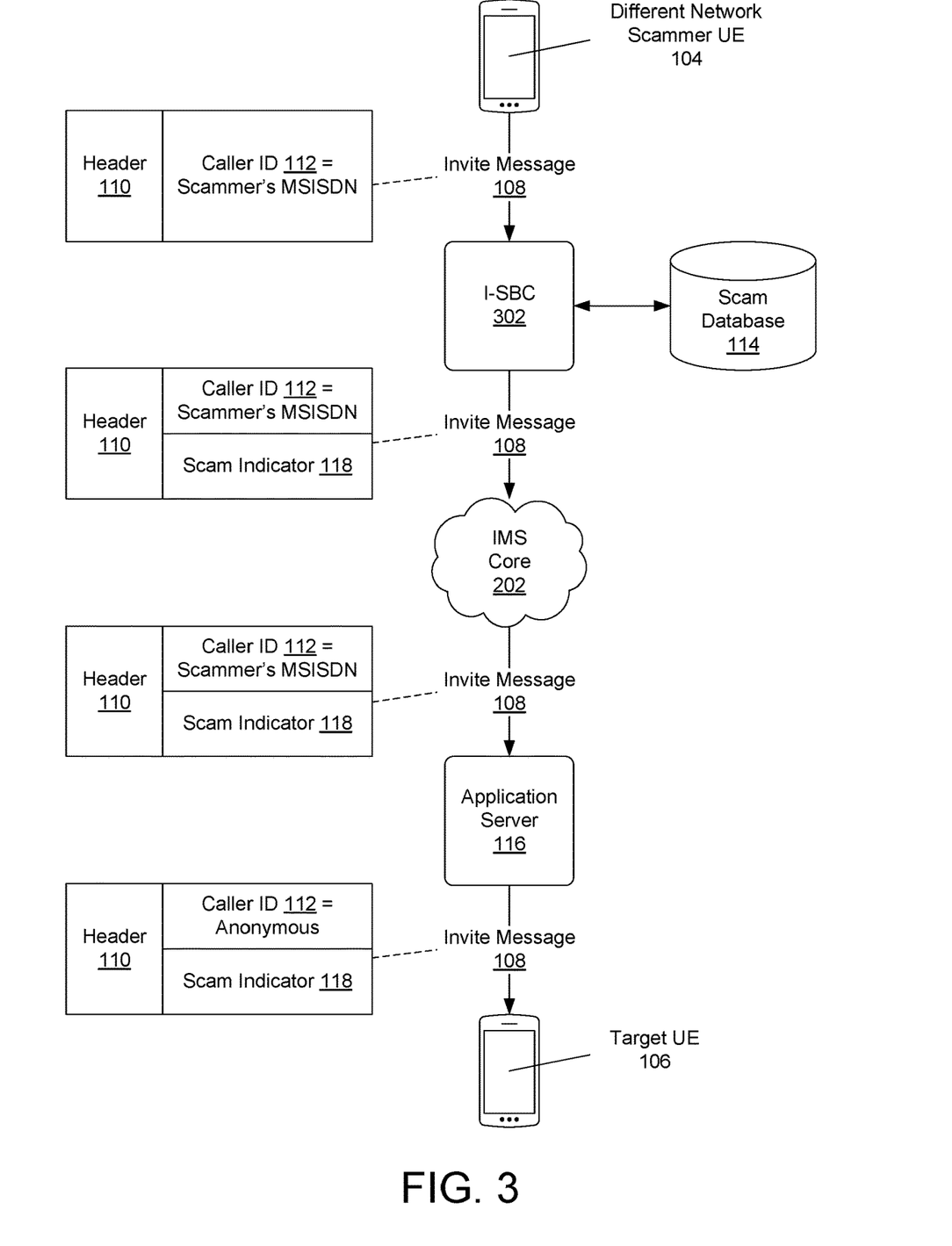
FIG. 3 depicts an example in which a scam call originates from a scammer UE that is connected to a different telecommunication network than a target UE.

FIG. 3 depicts an example in which a scam call originates from a scammer UE 104 that is connected to a different telecommunication network 102 than a target UE 106. The example shown in FIG. 3 may occur when the scammer UE 104 and the target UE 106 are connected to different peered wireless telecommunication networks 102 or when the target UE 106 is connected to a wireless telecommunication network 102 and the scammer UE 104 is connected to a PSTN.

The scammer UE 104 can attempt to initiate a call to the target UE 106 by transmitting an invite message 108 to a first telecommunication network 102 to which the scammer UE 104 is connected. The invite message 108 can identify the target UE 106, such as by an MSISDN associated with the target UE 106 included as a called party ID in a header 110 of the invite message 108. The invite message 108 can also include an MSISDN associated with the scammer UE 104 as caller ID 112 information in a header 110.

The invite message 108 can be routed through the first telecommunication network 102 and/or other telecommunication networks 102 to an Interconnect Session Border Controller (I-SBC) 302 of the telecommunication network 102 to which the target UE 106 is connected. The I-SBC 302 can accordingly be in the telecommunication network 102 that handles the terminating leg of the call. The I-SBC 302 can serve as an interface between telecommunication networks 102 such that they can exchange SIP messages and other data.

The I-SBC 302 can look up, in the scam database 114, the MSISDN included as caller ID 112 information in the header 110 of the received invite message 108. The I-SBC 302 can look up the MSISDN in the caller ID 112 information in the scam database 114 using a REST API query, an ENUM query, or any other type of query as described above. If the scam database 114 indicates that the MSISDN in the caller ID 112 information is associated with a likely scammer, the I-SBC 302 can add a scam indicator 118 to the header 110 of the invite message 108. For example, the I-SBC 302 can add or alter a PAI field of the header 110 to include "Scam Likely" or any other type of scam indicator 118. The I-SBC 302 can then forward the altered invite message 108 to an IMS core 202, which as described above can route the invite message 108 to an application server 116 of the IMS, such as an application server 116 that can handle the terminating leg of the call. Although the I-SBC 302 is described in this example as being the element that looks up the caller ID 112 in the scam database 114 and inserts a scam indicator 118 into an invite message 108, in other examples one or more other types of nodes or network elements can perform those operations before forwarding the altered invite message 108 to the application server 116.

The application server 116 can determine from the scam indicator 118 in the invite message 108, which may have been previously inserted by an I-SBC 302 or another network element as described above, that the invite message 108 is associated with a scam call. Based on this determination that the invite message 108 is associated with a scam call, the application server 116 can remove and/or replace the MSISDN in the invite message's caller ID 112. For example, the application server 116 can remove a scammer's MSISDN from a PAI field of the header 110 and/or replace it with an "Anonymous" or another alternate value.

The application server 116 can forward the invite message 108, with the modified caller ID 112, on through the telecommunication network 102 to the target UE 106, such that the target UE 106 receives the invite message 108 with a header 110 that includes the scam indicator 118 and does not include the scammer's MSISDN. In some examples, the modified invite message 108 can be routed from the application server 116 to the target UE 106 at least partially through the IMS core 202.

If the target UE 106 is configured to present scam warnings, it can present a scam warning while the call is ringing based on the scam indicator 118. Additionally, due to the removal and/or replacement of the scammer's MSISDN from the caller ID 112 information, the target UE 106 would also not present the scammer's MSISDN while the call is ringing or in a missed call notification or call history list. In examples in which the call is a non-real-time communication, such as a text or multimedia message, the target UE 106 would also not present the scammer's MSISDN when displaying or presenting the non-real-time communication to a user.

Removing and/or replacing a scammer's MSISDN from caller ID 112 information of an invite message 108 as described above can shield users of target UEs 106 from learning the scammer's MSISDN, such that users are unable to use the scammer's MSISDN to place a call back to the scammer. This can counter scammers who intentionally try to avoid having their calls be answered so that the calls instead appear in missed call information, which may otherwise pique user curiosity and entice target users into calling back the scammers. A scammer's MSISDN can similarly be hidden from target UEs when the call is a non-real-time communication such as a text or multimedia message, such that the scammer's MSISDN is not displayed to target users.

As described above, in some examples the application server 116 can be configured to add a scam indicator 118 and/or modify caller ID 112 information in an invite message's header 110 as described above to hide a scammer's MSISDN from a target UE 106. However, in other examples, if an invite message 108 includes a scam indicator 118 or a scam database 114 indicates that the invite message's caller ID 112 information corresponds with a likely scammer, the application server 116 can be configured to drop the invite message 108 so that it is not forwarded on to the target UE 106, thereby blocking the call from reaching the target UE 106.

In some cases, target users may still attempt to place calls to a scammer's MSISDN without knowing that the MSISDN is associated with a scammer. As one example, if an application server 116 handling the terminating leg of a call is not configured as described above to remove or replace a scammer's MSISDN from caller ID 112 information, missed call information at a target UE 106 may include the scammer's MSISDN such that a target user can attempt to place a call back to that MSISDN. As another example, a target user may learn a scammer's MSISDN from a source other than missed call information, and place a call to that MSISDN without knowing it is associated with a likely scam. For example, a target user may have received a scam email or text message that encourages the target user to place a voice call to a scammer's MSISDN. In these cases, an application server 116 handling the originating leg of the call to the scammer's MSISDN can use the scam database 114 to determine that a target UE 106 is attempting to call a likely scammer, and perform one or more actions to warn the user of the target UE 106 that the call is going to a scammer and/or to shield the target user's information from the scammer if the call is continued.

FIG. 4 depicts an example in which a target UE 106 sends an invite message 108 to a telecommunication network 102 to attempt to place a call to a scammer UE 104. A target user using the target UE 106 may not be aware that the scammer UE 104 is associated with a scammer, but may have learned of the scammer's MSISDN from missed call information if the examples of FIGS. 1-3 have not been implemented, or from another source such as a scam email. Here, because the target UE 106 is initiating the call, the invite message 108 can include caller ID 112 information associated with the target user of the target UE 106, such as the target user's MSISDN. The invite message 108 can also include a called party ID 402, such as the scammer's MSISDN, in the header 110 that identifies the terminating UE the target UE 106 is calling.

The invite message 108 can be routed through the telecommunication network to an application server 116 that can handle the originating leg of the call. For example, the invite message 108 can be routed through an IMS core 202 to the application server 116. The application server 116 can find the called party ID 402 included in the invite message 108, and look up the called party ID 402 in the scam database 114 using a REST API query, an ENUM query, or any other type of query as described above. If the scam database 114 indicates that the called party ID 402 is likely associated with a scammer, the application server 116 can determine that the target UE 106 is attempting to call a scammer UE 104, and that the MSISDN in the called party ID 402 is a scammer's MSISDN. Based on the determination that the target UE 106 is attempting to call a scammer UE 104, the application server 116 can take one or more actions to warn the user of the target UE 106 and/or shield the target user's information from the scammer UE 104.

For example, when the call is a real-time communication such as a voice or video call, and the application server 116 determines that the target UE 106 is attempting to call a scammer UE 104, the application server 116 can delay forwarding the invite message 108 and request that an element of the telecommunication network 102, such as a Media Resource Function (MRF) 404, provide a scam announcement 406 to the target UE 106 before the call is connected to the scammer UE 104. The scam announcement 406 can be a message, such as a recorded audio message, warning the target user that he or she has called a suspected scammer. For example, the scam announcement 406 can be a "whisper announcement" played by the MRF 404 to the target UE 106. As an example, from a target user's perspective, the target user can place a call to an MSISDN without knowing that it is a scammer's MSISDN. However, before the call is connected to the scammer, the MRF 404 or other network element can play a scam announcement 406 that is audible via the target UE 106 and warns the target user that he or she is attempting to call a likely scammer. In other examples in which the call is non-real-time communication, such as a text message or multimedia message, the scam announcement 406 can be a similar non-real-time communication that warns the target user that he or she is attempting to contact a scammer.

If the call is a real-time communication and a target UE 106 hangs up while a scam announcement 406 is playing, the application server 116 can discard the invite message 108 so that it is not forwarded to the scammer UE 104. In some examples, the scam announcement 406 can include a period of silence, such as a few seconds of silence, following an audible portion of the scam announcement 406 to provide the target user with time to decide whether or not to hang up or to continue the call. In other examples, the application server 116 and/or MRF 404 can wait for affirmative user input confirming that the target user wants to continue the call. For example, the scam announcement 406 can ask the target user to press "1" to confirm that the target user wants to continue the call, otherwise the call will end.

If the target user indicates that he or she wants to continue the despite being warned about the potential scam, for example by not hanging up the call during playback of the scam announcement 406 or by providing affirmative user input indicating a choice to continue the call, the application server 116 can forward the invite message 108 towards the scammer UE 104.

In addition to, or instead of, invoking the MRF 404 to play a scam announcement, the application server 116 can remove and/or replace the MSISDN in the caller ID 112 information when the scam database 114 indicates that the MSISDN in the called party ID 402 is associated with a likely scammer. For example, the application server 116 can remove the target user's MSISDN from a PAI field of the header 110 and/or replace it with an "Anonymous" or another alternate value.

The application server 116 can forward the invite message 108, with the modified caller ID 112, on through the telecommunication network 102 and/or other telecommunication networks 102 to the scammer UE 104, such that the scammer UE 104 receives the invite message 108 with a header 110 that does not include the target user's MSISDN. Accordingly, due to the removal and/or replacement of the target user's MSISDN from the caller ID 112 information, the scammer UE 104 would not be able to present the target user's MSISDN while the call is ringing, in a missed call notification or call history list, or in a messaging application.

By removing and/or replacing the caller ID 112, a scammer would not be able to use the caller ID 112 as part of a scam if the call is answered or received at the scammer UE 104. For example, although a scammer might be able to use a target user's MSISDN to look up information about the target user, such as the target user's name or address, and use that information to mislead or coerce the target user into a scam, here the scammer would not have access to the target user's MSISDN in the caller ID 112 information due to the application server's alteration of the header 110. Additionally, if the scammer UE 104 does not answer the call, the target user's MSISDN would not appear in a missed call list or call history information at the scammer UE 104, and the scammer would not be able to attempt a call back to the target user based on that information.

As described above, in some examples the application server 116 can be configured to identify that a call from a target UE 106 is going to a likely scammer UE 104 based on a check of the called party ID 402 against the scam database 114. In response, the application server 116 can perform at least one of removing a target user's MSISDN from the caller ID 112 information and providing a scam announcement 406 to the target UE 106. However, in other examples, if the application server 116 determines that a call is going to a likely scammer UE 104 based on a check of the called party ID 402 against the scam database 114, the application server 116 can be configured to drop the invite message 108 so that it is not forwarded on to the scammer UE 104, thereby blocking the call from reaching the scammer UE 104. In these examples, the application server 116 can also cause an announcement or notification to be provided to the target UE 106 that informs a user why their outgoing call was blocked.

Example Architecture

Figure 5:
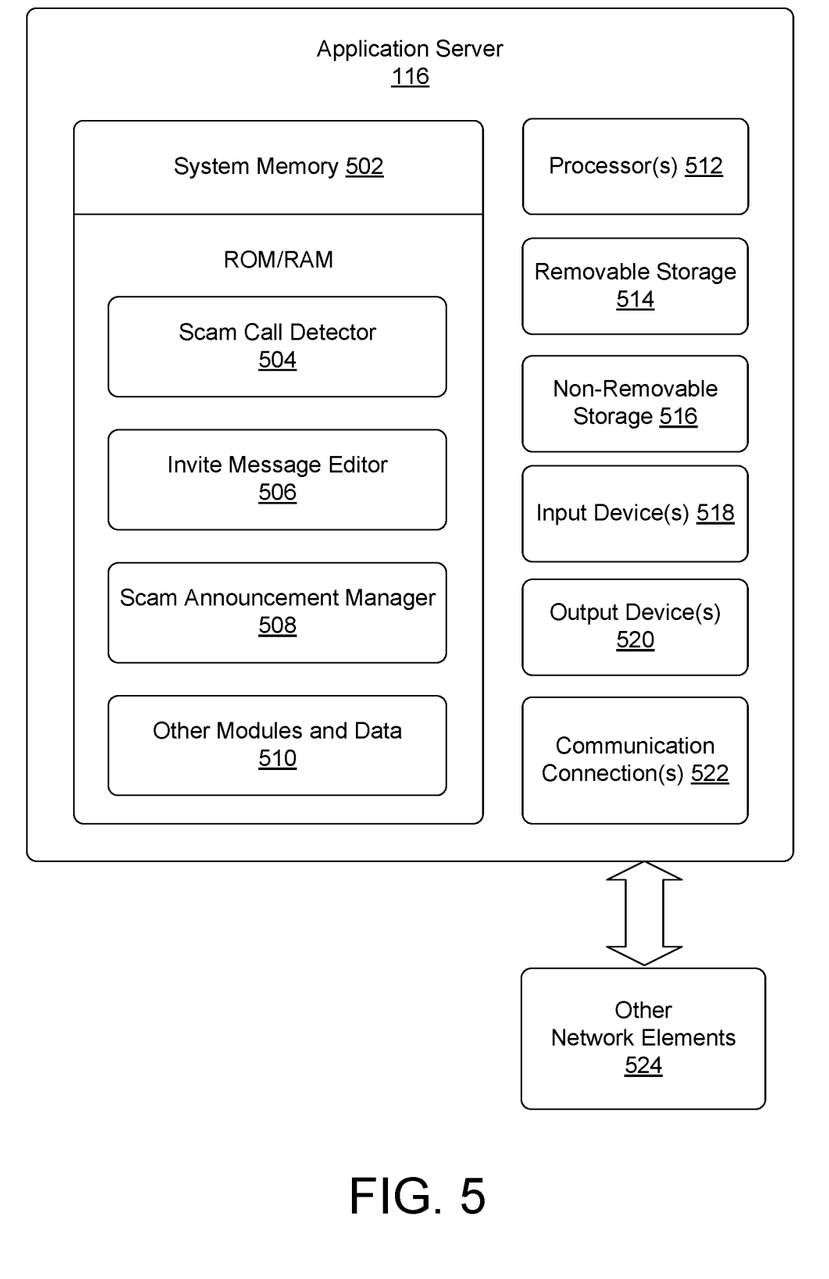
FIG. 5 depicts an example system architecture for an application server.

FIG. 5 depicts an example system architecture for an application server 116. An application server 116 can have a system memory 502 that stores data for the application server 116, including a scam call detector 504, an invite message editor 506, a scam announcement manager 508, and/or other modules and data 510.

In various examples, system memory 502 can be volatile (such as RAM), non-volatile (such as ROM, flash memory, etc.), or some combination of the two. Example system memory 502 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The scam call detector 504 can review an invite message 108 received by the application server 116 to determine if the invite message 108 came from a UE that is likely a scammer UE 104, or is going to a UE that is likely a scammer UE 104. When the scam call detector 504 determines that the invite message 108 came from a UE that is likely a scammer UE 104 and is being routed to a target UE 106, the scam call detector 504 can invoke the invite message editor 506 to edit the invite message 108 as discussed further below. When the scam call detector 504 determines that the invite message 108 is going from a target UE 106 to a UE that is likely a scammer UE 104, the scam call detector 504 can invoke the invite message editor 506 to edit the invite message 108, and/or invoke the scam announcement manager 508 to play a scam announcement 406 for the target UE 106, as discussed further below.

When an invite message 108 is being routed to a target UE 106, such that the application server 116 is operating on the mobile terminating leg of a call, the scam call detector 504 can determine if the invite message 108 came from a UE that is likely a scammer UE 104. When an I-SBC 302 or other network element inserted a scam indicator 118 into a header 110 of the invite message 108 prior to receipt of the invite message 108 by the application server 116, the scam call detector 504 can determine that the invite message 108 came from a UE that is likely a scammer UE 104 based on the scam indicator 118. However, if the invite message's header 110 does not contain a scam indicator 118, the scam call detector 504 can use caller ID 112 information in the invite message's header 110 to look up in a scam database 114 if the caller ID 112 is associated with a likely scammer UE 104. For example, the scam call detector 504 can use a REST API query, an ENUM query, or any other type of query as described above to check the caller ID 112 against the scam database 114. If the scam database 114 indicates that the caller ID 112 is associated with a likely scammer UE 104, the scam call detector 504 can instruct the invite message editor 506 to add a scam indicator 118 to the invite message's header 110. When the scam call detector 504 determines that the invite message 108 came from a UE that is likely a scammer UE 104, based either on an already present scam indicator 118 or on its own check with a scam database 114, the scam call detector 504 can instruct the invite message editor 506 to remove and/or replace the caller ID 112 in the invite message's header 110.

When an invite message 108 is being routed from a target UE 106, such that the application server 106 is operating on the mobile originating leg of a call, the scam call detector 504 can determine if the called party ID 402 in the invite message's header is associated with a likely scammer. For example, the scam call detector 504 can use the called party ID 402 in the invite message's header 110 to look up in a scam database 114 whether or not the called party ID 402 is associated with a likely scammer UE 104. When the scam call detector 504 determines that the called party ID 402 is associated with a likely scammer UE 104, the scam call detector 504 can instruct the invite message editor 506 to remove and/or replace the caller ID 112 in the invite message's header 110. Alternately, or additionally, the scam call detector 504 can instruct the scam announcement manager 508 to play or present a scam announcement 406 for the target UE 106.

The invite message editor 506 can, upon instruction by the scam call detector 504, remove and/or replace a caller ID 112 in the invite message's header 110. For example, the scam call detector 504 can replace a MSISDN in a caller ID 112 field with "Anonymous" or another value. When the invite message 108 is going to a target UE 106 from a scammer UE 104, the invite message editor 506 can accordingly remove a scammer's MSISDN from the caller ID 112 information such that the target UE 106 does not display the scammer's MSISDN while the call is ringing or in missed call information. When the invite message 108 is going to a scammer UE 104 from a target UE 106, the invite message editor 506 can accordingly remove a target user's MSISDN from the caller ID 112 information such that the scammer UE 104 does not receive the target user's MSISDN and a scammer cannot use it to identify the target user. The invite message editor 506 can also, upon instruction by the scam call detector 504, insert a scam indicator 118 into an invite message's header 110.

The scam announcement manager 508 can, upon instruction by the scam call detector 504, request that an MRF 404 or another network element play other otherwise provide a scam announcement 406 for a target UE 106 that sent an invite message 108. In some example, the scam announcement manager 508 cause the application server 116 to hold the invite message 108 while the scam announcement 406 is being played to the target UE 106, and then drop the invite message 108 if the target UE 106 hangs up the call during playback of the scam announcement 406 or forward the invite message 108 on towards the scammer UE 104 if the target UE 106 has not hung up the call after playback of the scam announcement 406.

The other modules and data 510 can be utilized by the application server 116 to perform or enable performing any action taken by the application server 116. The other modules and data 510 can include a platform and applications, and data utilized by the platform and applications.

The application server 116 can also include processor(s) 512, removable storage 514, non-removable storage 516, input device(s) 518, output device(s) 520, and/or communication connections 522 for communicating with other network elements 524.

In some embodiments, the processor(s) 512 can be a central processing unit (CPU), a graphics processing unit (GPU), both CPU and GPU, or other processing unit or component known in the art.

The application server 116 can also include additional data storage devices (removable and/or non-removable) such as, for example, magnetic disks, optical disks, or tape. Such additional storage is illustrated in FIG. 5 by removable storage 514 and non-removable storage 516. Computer storage media may include volatile and nonvolatile, removable and non-removable media implemented in any method or technology for storage of information, such as computer readable instructions, data structures, program modules, or other data. System memory 502, removable storage 514 and non-removable storage 516 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the application server 116. Any such computer-readable storage media can be part of the application server 116. In various examples, any or all of system memory 502, removable storage 514, and non-removable storage 516, store programming instructions which, when executed, implement some or all of the herein-described operations of the application server 116.

In some examples, the application server 116 can also have input device(s) 518, such as a keyboard, a mouse, a touch-sensitive display, voice input device, etc., and/or output device(s) 520 such as a display, speakers, a printer, etc. These devices are well known in the art and need not be discussed at length here.

The application server 116 can also contain communication connections 522 that allow the application server 116 to communicate with other network elements 524, such as a scam database 114 and/or elements of an IMS core 202.

Example Operations

Figure 6:
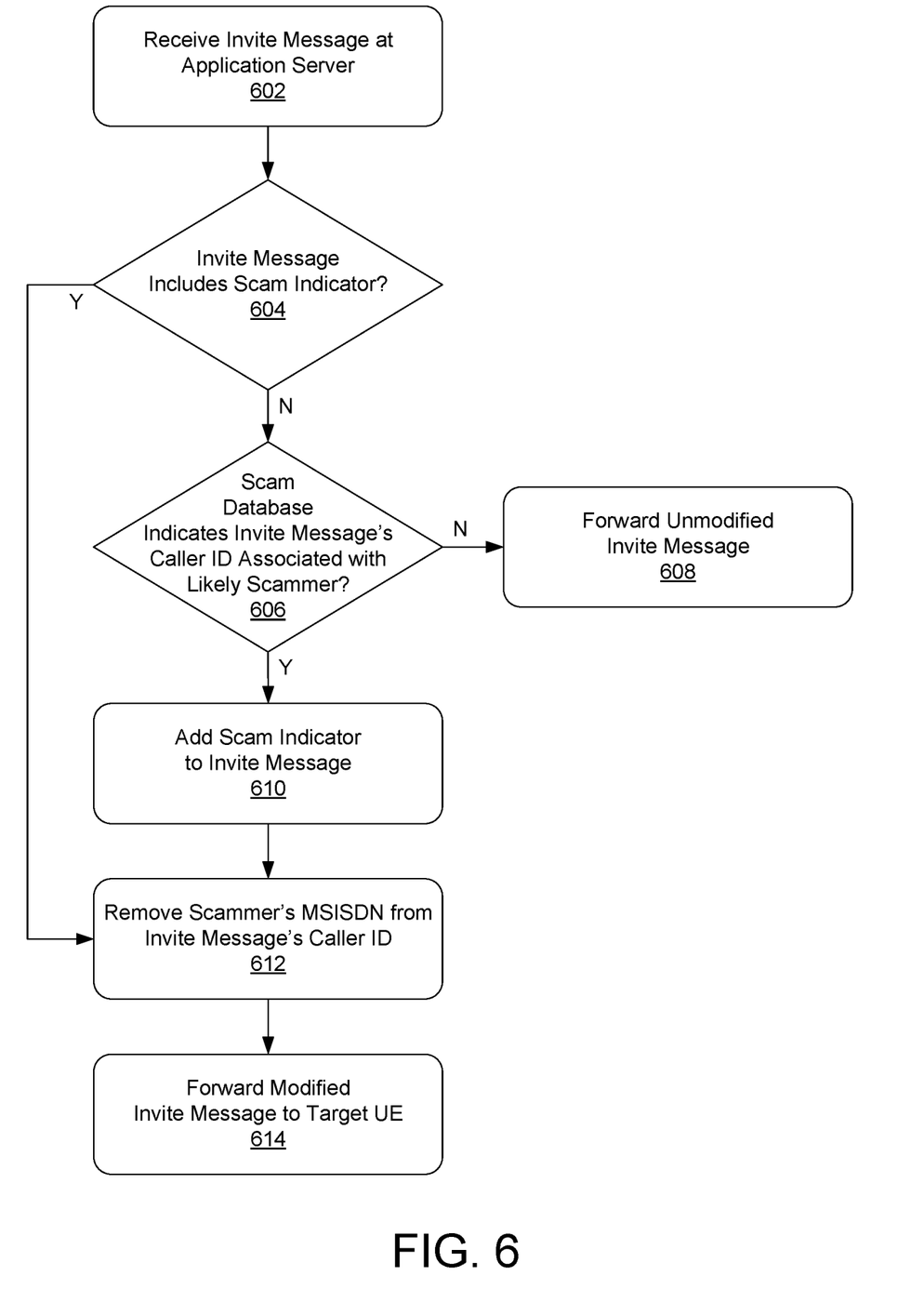
FIG. 6 depicts an example process by which an application server can shield a target UE from receiving caller ID information about a scammer UE.

FIG. 6 depicts an example process by which an application server 116 can shield a target UE 106 from receiving caller ID 112 information about a scammer UE 104. The process of FIG. 6 can operate within a mobile terminating leg of a call, wherein the application server 116 is part of a telecommunication network 102 to which the target UE 106 is connected.

At block 602, the application server 116 can receive an invite message 108. For example, the invite message 108 from an originating UE can be routed through one or more telecommunication networks 102 to an IMS core 202, which can route the invite message 108 to the application server 116. The invite message 108 can be a request to initiate a call, such as a voice call, a video call, a conference call, a messaging session, or any other type of communication session. The invite message 108 can have a header 110 that includes a caller ID 112 associated with the originating UE.

At block 604, the application server 116 can determine if the invite message's header 110 includes a scam indicator 118. For example, the invite message's header 110 may include a scam indicator 118 if the invite message was previously processed by another network element, such as an I-SBC 302, that added the scam indicator 118 based on a check of the caller ID 112 against a scam database 114. If the invite message's header 110 includes a scam indicator 118, the application server 116 can consider the originating UE to be a scammer UE 104 and the caller ID 112 in the invite message 108 to be a scammer's MSISDN, and in response move to block 612 to remove the scammer's MSISDN from the invite message's caller ID 112 information. If the invite message's header 110 does not include a scam indicator 118, the application server 116 can move to block 606.

At block 606, the application server 116 can perform a check of the caller ID 112 from the invite message's header 110 against a scam database 114. If the scam database 114 indicates that the caller ID 112 is not likely to be associated with a scammer, then the application server 116 can move to block 608 and forward the invite message 108 onward toward the target UE 106, without modifying its caller ID 112. However, if the scam database 114 indicates that the caller ID 112 is associated with a likely scammer, the application server 116 can consider the originating UE to be a scammer UE 104 and the caller ID 112 in the invite message 108 to be a scammer's MSISDN, and in response move to block 610 and add a scam indicator 118 to the invite message's header 110. The application server 116 can also move to block 612 in response to determining that the caller ID 112 is associated with a likely scammer, to remove the scammer's MSISDN from the invite message's caller ID 112 information.

At block 612, the application server 116 can remove and/or replace the scammer's MSISDN in the caller ID 112 information of the invite message's header 110. For example, the application server 116 can replace the scammer's MSISDN with another value, such as "Anonymous," in a PAI field of the invite message's header 110. The application server 116 can then forward the invite message 108, with the modified caller ID 112, onward toward the target UE 106 at block 614.

When the application server 116 removes a scammer's MSISDN from the caller ID 112 information of an invite message's header 110, the target UE 106 would not display the scammer's MSISDN when the call is ringing, in missed call information, in a call history list, in a messaging application, or elsewhere. Accordingly, a user of the target UE 106 would not be able to learn the scammer's MSISDN from the target UE 106 and use that information to call back or otherwise reply to the scammer even if he or she becomes curious about a missed call. This can decrease the chances of the target user becoming a victim of a scam.

Figure 7:
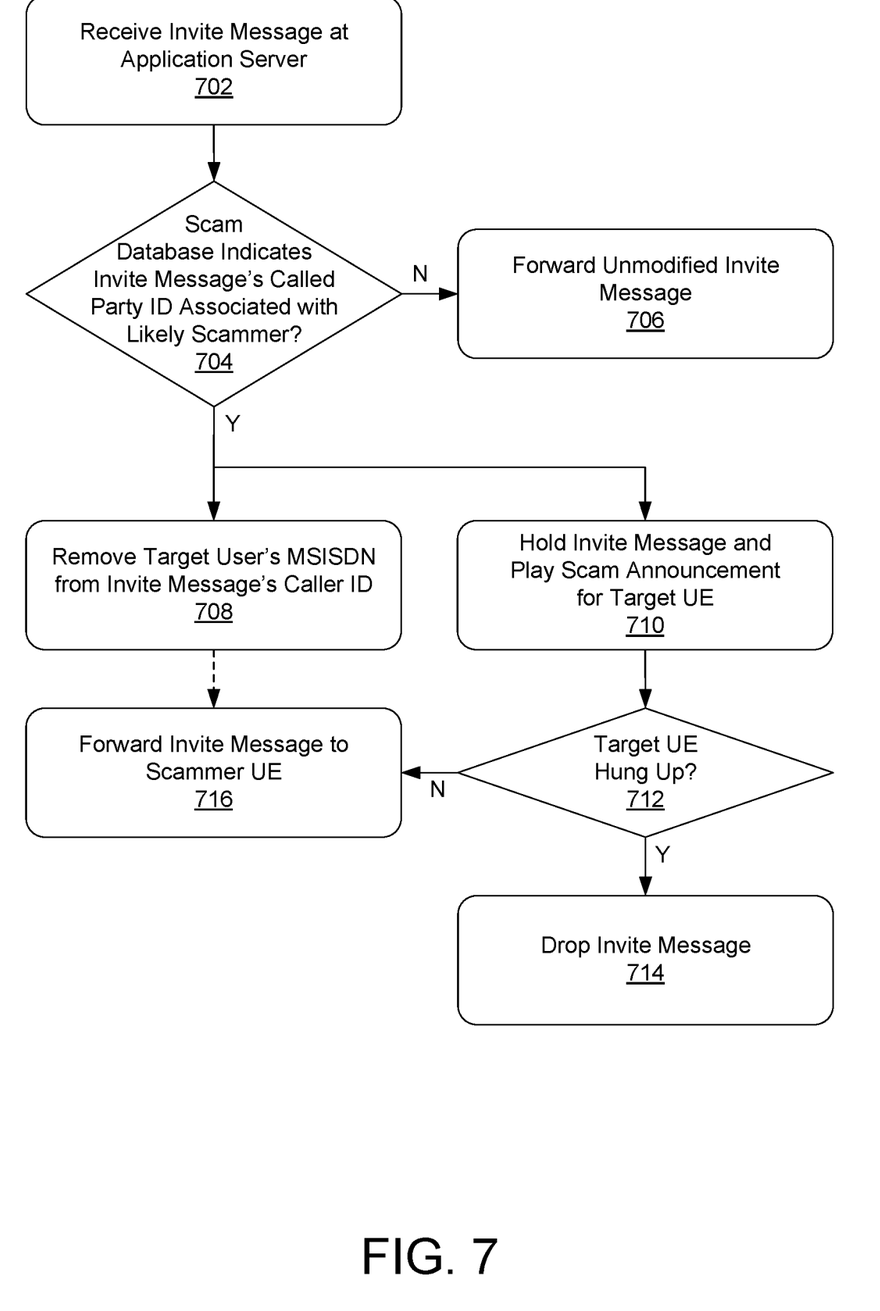
FIG. 7 depicts an example process by which an application server can warn a target user when a target UE is calling a scammer, and/or shield the target user's information from the scammer.

FIG. 7 depicts an example process by which an application server 116 can warn a target user when a target UE 106 is calling a scammer, and/or shield the target user's information from the scammer. The process of FIG. 7 can operate within a mobile originating leg of a call, wherein the application server 116 is part of a telecommunication network 102 to which the target UE 106 is connected. In FIG. 7, a target user using the target UE 106 may not be aware that they are attempting to call a scammer UE 104, but may have learned of the scammer's MSISDN from missed call information if the examples of FIGS. 1-3 or FIG. 6 have not been implemented, or from another source such as a scam email.

At block 702, the application server 116 can receive an invite message 108 that was sent by the target UE 106. For example, the invite message 108 from the target UE 106 can be routed through the telecommunication network 102 to an IMS core 202, which can route the invite message 108 to the application server 116. The invite message 108 can be a request to initiate a call, such as a voice call, a video call, a conference call, a messaging session, or any other type of communication session. The invite message 108 can have a header 110 that includes a caller ID 112 associated with the target UE 106, as well as a called party ID 402 associated with the terminating UE that the target UE 106 is attempting to call.

At block 704, the application server 116 can perform a check of the called party ID 402 from the invite message's header 110 against a scam database 114. If the scam database 114 indicates that the called party ID 402 is not likely to be associated with a scammer, then the application server 116 can move to block 706 and forward the invite message 108, without modifying the caller ID 112, onward toward the UE identified by the called party ID 402. However, if the scam database 114 indicates that the called party ID 402 is associated with a likely scammer, the application server 116 can consider the terminating UE identified by the called party ID 402 to be a scammer UE 104, and in response move to blocks 708 and/or 710.

At block 708, the application server 116 can remove and/or replace the target user's MSISDN in the caller ID 112 information of the invite message's header 110. For example, the application server 116 can replace the target user's MSISDN with another value, such as "Anonymous," in a PAI field of the invite message's header 110. If the application server 116 is not configured to also cause a scam announcement 406 to be played for the target UE 106, the application server 116 can forward the invite message 108, with the modified caller ID 112, onward toward the scammer UE 104 at block 716. However, if the application server 116 is configured to also cause a scam announcement 406 to be played for the target UE 106 during block 710, the application server 116 can wait to verify at block 712 that the target UE 106 did not hang up the call during playback of the scam announcement message 406 before moving to block 716 to forward the modified invite message 108 onward toward the scammer UE 104.

At block 710, the application server 116 can hold the invite message 108 and cause a scam announcement 406 to be played to the target UE 106. For example, the application server 116 can invoke an MRF 404 to play the scam announcement 406 so that it is audible via the target UE 106 to a user. The scam announcement 406 can warn the user, based on the determination that the called party ID 402 is associated with a likely scammer, that the user is attempting to call a likely scammer. The application server 116 can determine at block 712 if the target UE 106 hung up the call during playback of the scam announcement 406. If the target UE 106 did hang up the call during the scam announcement, the application server 116 can drop the invite message 108 at block 714 such that the invite message 108 is not forwarded to the scammer UE 104. However, if the target UE 106 did not hang up the call during the scam announcement, the application server 116 can forward the invite message 108 onward toward the scammer UE 104 at block 716. In some examples, the invite message 108 forwarded during block 716 can be a modified invite message 108 based on removal of the target user's MSISDN from the caller ID 112 during block 708. However, if the application server 116 is not configured to perform block 708 and does not remove the target user's MSISDN from the caller ID 112, the invite message 108 can forwarded during block 716 without modifying its caller ID 112.

When the application server 116 causes a scam announcement 406 to be played for the target UE 106, the scam announcement 406 may persuade the target user not to continue the call. In this case, the invite message 108 would be dropped and not reach the scammer UE 104. However, even if the call is continued, the application server 116 can remove the target user's MSISDN from the caller ID 112 information of the invite message's header 110, such that the scammer UE 104 would not display the target user's MSISDN when the call is ringing or in missed call information. Accordingly, a scammer would not be able to learn the target user's MSISDN from the scammer UE 104 and use that information to ensnare the target user in a scam. Accordingly, one or both actions can decrease the chances of the target user becoming a victim of a scam.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. An application server of a telecommunication network, comprising:
one or more processors; and
memory storing computer-executable instructions that, when executed by the one or more processors, cause the application server to perform operations comprising:
receiving an invite message associated with a call from an originating user equipment (UE) to a terminating UE, the invite message having a header including caller identification (ID) information associated with the originating UE and called party ID information associated with the terminating UE, the caller ID information including a mobile station international subscriber directory number (MSISDN) of the originating UE;
determining that one of the originating UE or the terminating UE is a scammer UE;
in response to determining that the one of the originating UE or the terminating UE is a scammer UE, modifying the header of the invite message to remove the caller ID information associated with the originating UE; and
forwarding the invite message toward the terminating UE without the MSISDN and without a replacement MSISDN.

2. The application server of claim 1, wherein the originating UE is determined to be the scammer UE based on the presence of a scam indicator in the header of the invite message.

3. The application server of claim 1, wherein the originating UE is determined to be the scammer UE by:
submitting a query with the caller ID information to a scam database; and
receiving, from the scam database, an indication that the caller ID information is associated with a likely scammer.

4. The application server of claim 3, wherein the query is an Electronic Number Mapping System (ENUM) query, and the indication is at least one of a predefined Service Provider ID (SPID) or a Routing Number (RN) indicating that the caller ID information is associated with the likely scammer.

5. The application server of claim 3, wherein the query is a Representational State Transfer (REST) Application Programming Interface (API) call.

6. The application server of claim 3, wherein the operations further comprise inserting a scam indicator into the header of the invite message based on the indication that the caller ID information is associated with the likely scammer.

7. The application server of claim 1, wherein the terminating UE is determined to be the scammer UE by:
submitting a query with the called party ID information to a scam database; and
receiving, from the scam database, an indication that the called party ID information is associated with a likely scammer.

8. The application server of claim 1, wherein modifying the header comprises replacing the caller ID information associated with the originating UE with the text string "Anonymous".

9. The application server of claim 1, wherein the operations further comprise, when the terminating UE is determined to be the scammer UE, invoking playback of a scam announcement to the originating UE that warns a user of the originating UE that the call is going to a likely scammer.

10. The application server of claim 9, wherein the operations further comprise forwarding the invite message on to the terminating UE after the playback of the scam announcement has completed and upon a determination that the originating UE did not hang up during playback of the scam announcement.

11. The application server of claim 1, wherein the caller ID information is included in a "P-Asserted-Identity" (PAI) field of the header.

12. A method comprising:
   receiving, by an application server of a telecommunication network, an invite message associated with a call to a target user equipment (UE), the invite message having a header including caller identification (ID) information associated with an originating UE, the caller ID information including a mobile station international subscriber directory number (MSISDN) of the originating UE;
   determining, by the application server, that the originating UE is a scammer UE;
   in response to determining that the originating UE is the scammer UE, modifying, by the application server, the header of the invite message to remove the caller ID information associated with the originating UE; and
   forwarding, by the application server, the invite message toward the target UE without the MSISDN and without a replacement MSISDN.

13. The method of claim 12, wherein the application server determines that the originating UE is a scammer UE based on the presence of a scam indicator in the header of the invite message.

14. The method of claim 12, wherein determining that the originating UE is the scammer UE comprises:
   submitting, by the application server, a query with the caller ID information to a scam database; and
   receiving, by the application server from the scam database, an indication that the caller ID information is associated with a likely scammer.

15. The method of claim 14, further comprising inserting, by the application server, a scam indicator into the header of the invite message based on the indication that the caller ID information is associated with the likely scammer.

16. The method of claim 12, wherein the caller ID information is included in a "P-Asserted-Identity" (PAI) field of the header.

17. A method comprising:
   receiving, by an application server of a telecommunication network, an invite message associated with a call from a target user equipment (UE) to a terminating UE, the invite message having a header including caller identification (ID) information associated with the target UE and called party ID information associated with the terminating UE;
   determining, by the application server, that the terminating UE is a scammer UE; and
   in response to determining that the terminating UE is a scammer UE, performing, by the application server,
   modifying the header of the invite message to remove the caller ID information associated with the target UE.

18. The method of claim 17, wherein determining that the terminating UE is the scammer UE comprises:
   submitting, by the application server, a query with the called party ID information to a scam database;
   receiving, by the application server from the scam database, an indication that the called party ID information is associated with the likely scammer.

19. The method of claim 17, further comprising forwarding the invite message on to the terminating UE.

20. The method of claim 19, further comprising, in response to determining that the terminating UE is a scammer UE, invoking playback of a scam announcement to the target UE that warns a user of the target UE that the call is going to the likely scammer,
   wherein the forwarding of the invite message is delayed until the playback of the scam announcement has completed and is performed based on a determination that the target UE did not hang up during playback of the scam announcement.

* * * * *